Jan. 2, 1968     A. G. BROWN ET AL     3,361,279
BALE COLLECTOR

Filed Dec. 2, 1965     3 Sheets-Sheet 1

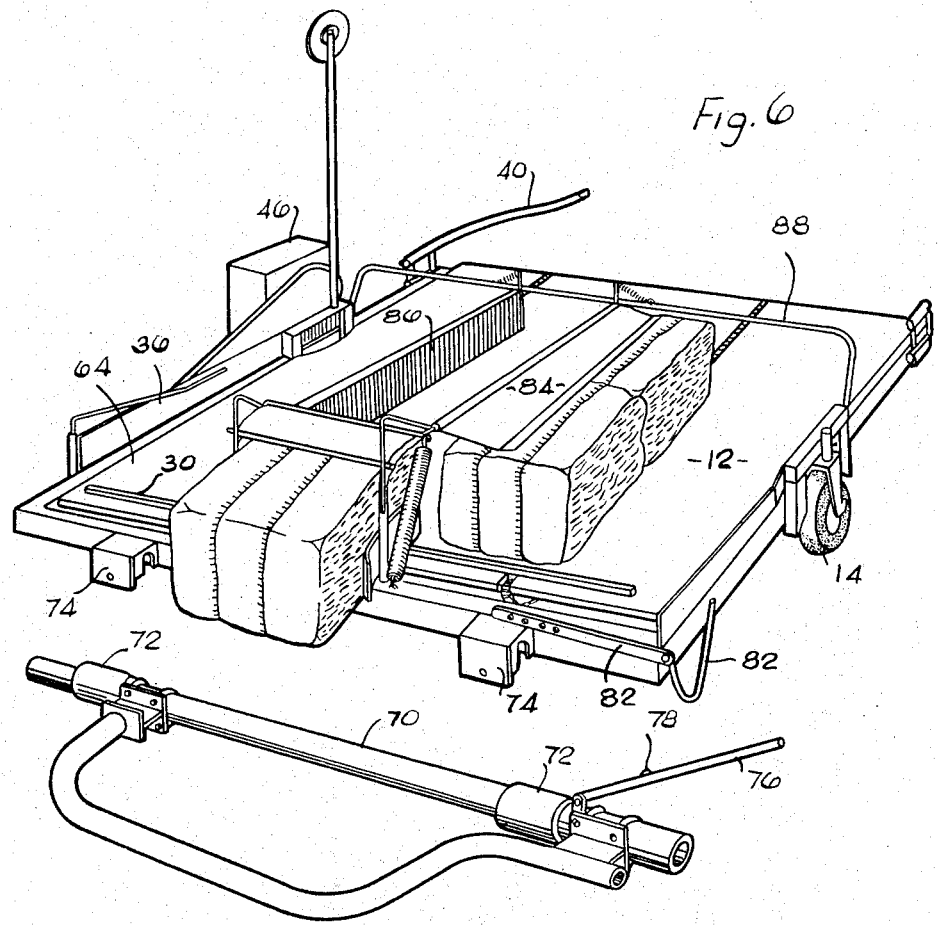

United States Patent Office 3,361,279
Patented Jan. 2, 1968

3,361,279
BALE COLLECTOR
Alan G. Brown, Leighton Buzzard, Bernard G. Brown, Bletchley, and Arthur W. G. Brown, Leighton Buzzard, England, assignors to Brown's Agricultural Machinery Company Limited, Leighton Buzzard, England, a British company
Filed Dec. 2, 1965, Ser. No. 511,119
4 Claims. (Cl. 214—519)

ABSTRACT OF THE DISCLOSURE

A bale collector for attachment to a baler consists of a wheeled platform onto which bales are discharged in pairs. When a first pair of bales are on the platform a longitudinally extending pusher rod is moved transversely towards one side of the platform to move the pair of bales towards said one side. The second pair of bales fed onto the platform is moved towards the other side; a third pair of bales is moved toward said one side; and a fourth pair of bales is moved towards the other side effecting actuation of a discharge means which includes a transversely extending pusher rod mounted on endless chains and movable rearwardly over the platform to discharge the four pairs of bales onto the ground.

---

This invention relates to a bale collector for collecting bales of hay, straw or the like and has for its object the provision of a new or improved collector which will collect bales discharged from a baler or like machine and deposit a predetermined number of bales upon the ground in a predetermined array.

Figure 1:
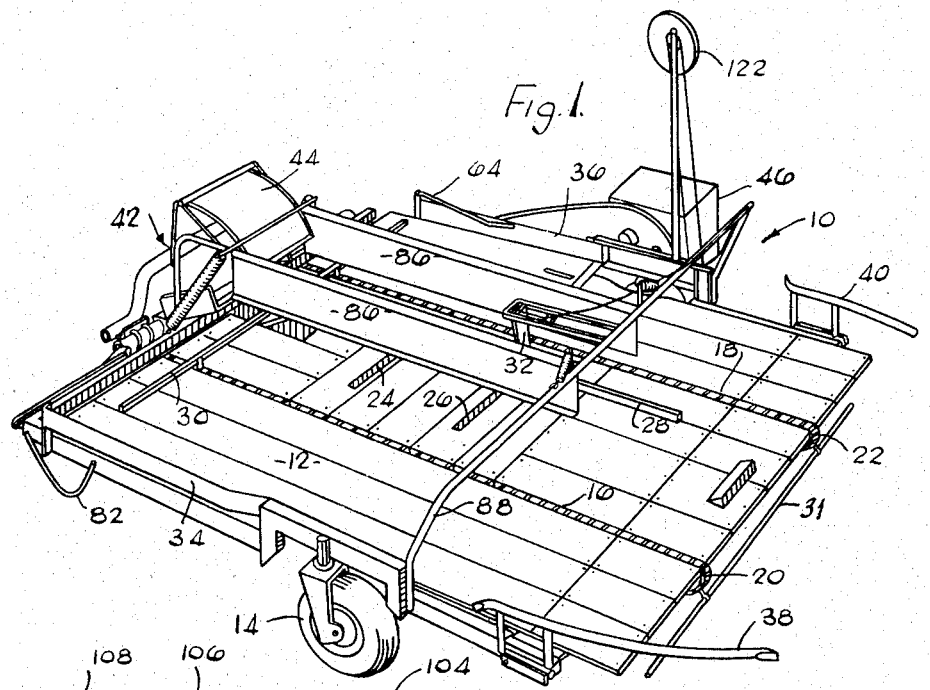
Figure 2:
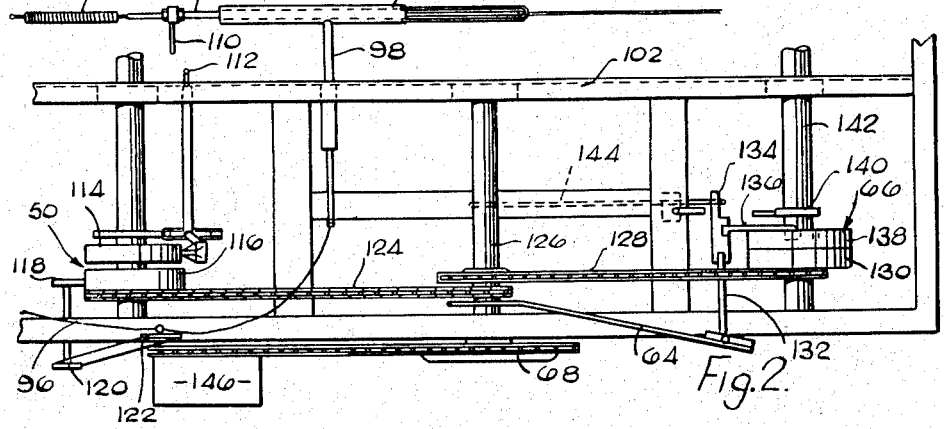
Figure 3:
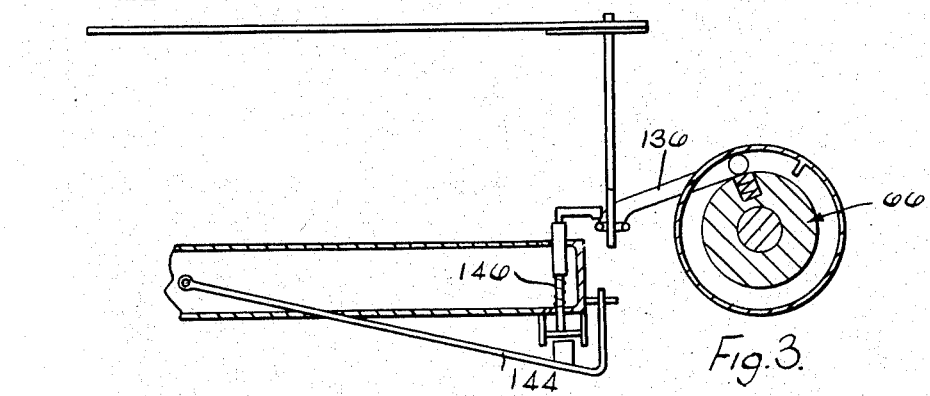
Figure 4:
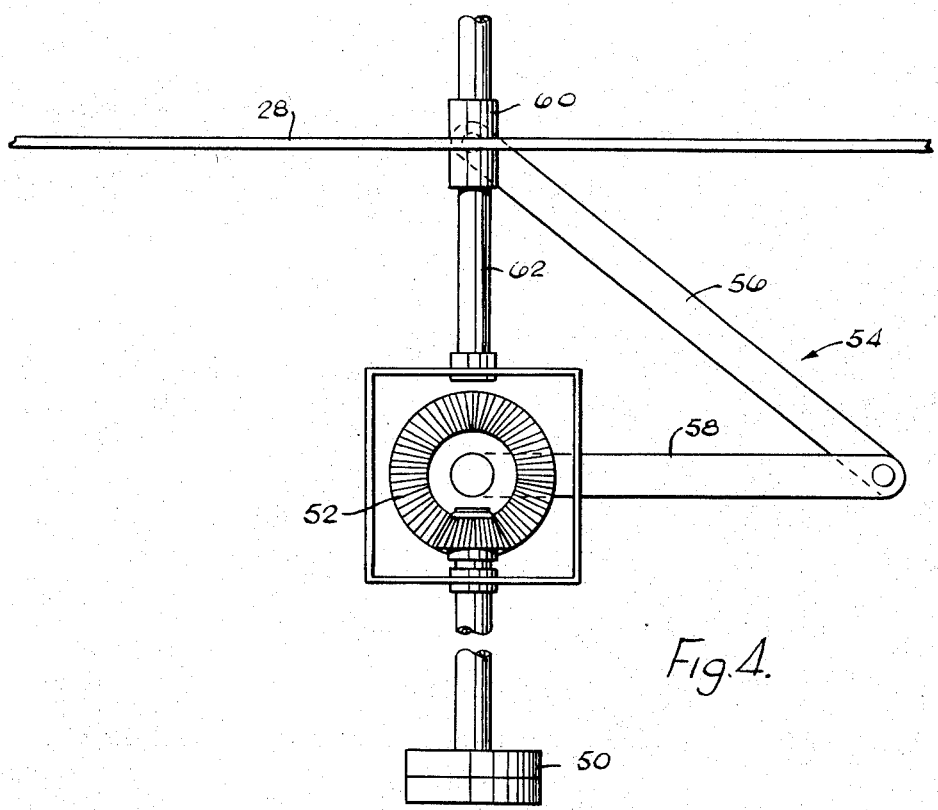
Figure 5:
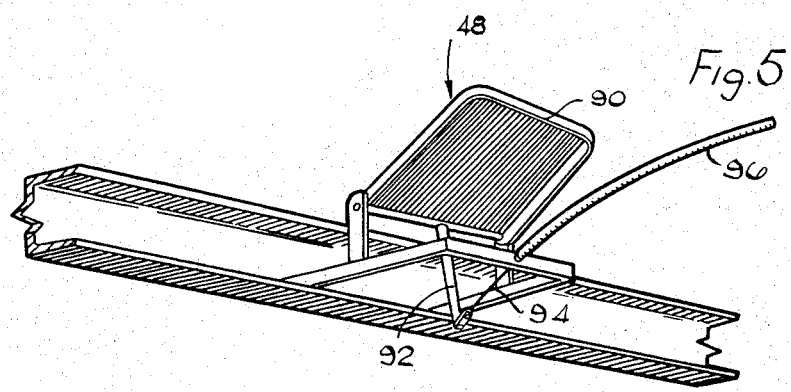

The invention will now be described by way of example with reference to the accompanying drawings in which:

FIGURE 1 is a perspective view of the bale collector in an inoperative condition and illustrating the first pusher rod which extends in the direction of travel of the bale collector and the second pusher rod extending transversely thereto, FIGURE 2 is a detail plan view of the bale collector with the boards forming the supporting platform removed and illustrating the means for operating the clutches in the drive to the first and second pusher rods, FIGURE 3 is a detail vertical section illustrating the means for de-actuating the clutch in the drive to the second pusher rod, FIGURE 4 is a plan view of the drive to the first pusher rod, FIGURE 5 is a detail view illustrating the construction of one of the latch members, and FIGURE 6 is a perspective view of the bale collector showing two bales deposited onto the supporting platform with a third bale just prior to deposition and illustrating the means for coupling the bale collector to the baler.

The bale collector 10 is adapted to receive eight bales from the baler (not shown) and then transfer these bales to the ground in two rows of four bales so that they may conveniently be collected and transferred to a collecting vehicle such as a farm cart by means of a bale loader.

The bale collector 10 is adapted to be connected to the rear of the baler and includes a wooden supporting platform 12 and a pair of ground engaging wheels 14 disposed on either side and towards the rear of the supporting platform 12. The platform 12 is formed with a pair of longitudinally extending slots 16 and 18 in each of which an endless chain 20 or 22 is disposed. A pair of transversely extending slots 24 and 26 are also formed in the platform 12 and these slots receive arms which are connected to a first pusher rod 28 which extends longitudinally of the platform. A transversely extending pusher rod 30 is connected to the pair of endless chains 20 and 22. The pair of endless chains also carry a bar 31 which is normally disposed just above the rear of the platform 12 and this bar serves to prevent bales from sliding off the platform when the baler is going up an incline.

Adjacent the rear and approximately centrally of the platform 12 there is disposed a first latch member 32 which forms part of the controls for operation of the longitudinally extending pusher rod 28. At either side of the supporting platform 12 there is disposed an upwardly extending support rail 34 or 36. Extending rearwardly of the supporting platform there are provided a pair of inwardly extending guide members 38 and 40.

The bale collector when in use and connected to the baler is connected to the baler in such a way that bales discharged from the baler pass between the arms of a guide element 42 which has a spring-loaded flap 44. A motor 46 is mounted on the bale collector and drives the two pusher rods 28 and 30 by means of suitable gearing disposed beneath the platform.

When a bale is discharged from the baler it passes through the guide elements 42 against the action of the flap 44 and then falls upon the supporting platform 12 so as to operate a second latch member 48 shown in FIGURE 5. When the next bale is discharged this second bale forces the first bale towards the rear of the platform 12 until it engages and removes the first latch member 32 disposed near the rear of the platform. Movement of this first latch member 32 and the subsequent operation of the second latch member 48 when the second bale falls onto the supporting platform 12 causes a clutch 50 in the drive to the longitudinally extending pusher rod 28 to be rendered operative in a manner to be hereinafter described. Upon engagement of clutch 50 drive is transmitted to a bevel gear mechanism 52 disposed beneath the platform which causes a linkage 54 comprising a pair of linkage arms 56 and 58 to move so as to effect transverse movement of the first pusher rod 28 so that the pair of bales which have been discharged from the baler are moved towards one side (the left-hand side as shown in FIGURE 1) of the platform 12. The pusher rod 28 remains in this position until the latch members 32 and 48 and the clutch 50 are again operated. The discharge of a second pair of bales again effects operation of the pusher rod 28 so that the second pair of bales are pushed to the opposite side (the right-hand side as shown in FIGURE 1) of the supporting platform. A third and a fourth pair of bales are moved in the same way as the first and second pair of bales.

A third latch member 64 is disposed at the side of the supporting platform 12 to which the second and the fourth pair of bales are moved. Movement of this third latch member 64 causes a clutch 66 to be rendered operative in the drive to the pair of endless chains 20 and 22 to which the transversely extending pusher rod 30 is connected. Upon movement of this third latch member 64 and operation of clutch 66 the pair of endless chains carry the transversely extending pusher rod 30 rearwardly of the platform. A slip clutch 68 is also provided in the drive to the two pusher rods 28 and 30 and this slip clutch 68 is dis-engaged in the event that the rate of rearward movement of the pusher rod 30 relative to the platform exceeds the rate of forward movement of the baler and bale collector.

As the transversely extending pusher rod 30 drives rearwardly along the platform it carries with it the four pairs of bales which have been disposed thereon and thus transferred to the ground. As the bales are spaced apart when disposed upon the platform it is necessary that they should be moved inwardly upon discharge and this is effected by the provision of the rearwardly extending guide members 38 and 40 which urge the bales inwardly as they are being discharged.

It has been found experimentally that the co-efficient of friction between the bales of straw or hay and a wooden surface is less than the co-efficient of friction between the bales and a steel or iron platform. It is, therefore, preferable to employ a wood supporting platform which is made up of a number of sections which can be removed separately.

In use the bale collector is normally off-set from the baler as the discharge outlet of the baler is normally to one side thereof. When driving the bale collector and the baler along a highway the bale collector is trailed directly behind the baler and in order to enable easy adjustment of the lateral position of the bale collector with respect to the baler the means for locking the bale collector to the baler includes a transversely extending rod 70 having means for attachment to a member (not shown) disposed at the rear of the baler.

The rod 70 has a pair of bearing sleeves 72 mounted on it and these sleeves 72 can be brought into register with socketed members 74 secured to the front of the bale collector 10 and locked in position in the socketed members 74 by means of locking pins. The bale collector is secured in either a trailing or an off-set position by means of a locking arm pivotally mounted on the rod 70. The locking arm 76 has a projecting pin 78 which engages in any one of the holes in a fastening member 80 secured to the front of the bale collector. The locking arm 76 may be inclined outwardly or inwardly of the rod 70 for maintaining the bale collector in either the trailing or off-set position.

The bale collector is provided at its front end with a pair of skids 82 and a pair of spring-loaded flaps 84 and 86 are provided centrally of the supporting platform 12. These flaps 84 and 86 are supported on frame members extending between the guide 42 and a frame 88 on which the first latch member 32 is mounted. The flaps 84 and 86 serve to maintain bales discharged onto the platform in a horizontal condition as more particularly shown in FIGURE 6.

Referring now mainly to FIGURE 2 to 5 the first and second latch members 32 and 48 each include a pivotally mounted trip member 90 which is connected by means of a linkage 92 to the inner member 94 of a Bowden cable 96. The inner member at the other end of the Bowden mechanism of the first latch member includes a shaft 98 passing through a collar 100 secured to the frame 102 of the bale collector and this shaft 98 forms part of a T-shaped member which also includes the outer member 104 at the other end of the Bowden mechanism of the second latch member 48. The inner member 106 of this Bowden mechanism comprises a rod connected by means of a spring 108 to the frame of the bale collector which rod carries a switch member 110 which is adapted to engage the operating member 112 of clutch 50 to move the driven member 114 of clutch 50 into driving engagement with the driving member 116. Clutch 50 is of the type which is automatically dis-engaged after the driven member has been driven through one complete revolution. The driving member 116 of latch 50 is continuously driven and frictionally drives a wheel 118 so as to drive a pulley 120 to rotate an indicator member 122 mounted on a shaft at the side of the supporting platform. This indicator member 122 is painted with strips or in any other convenient manner and is mounted in such a position that it is readily visible to a person driving a tractor towing the baler and bale collector to indicate to the driver that the motor 46 is operative and hence that the drive member 116 of clutch 50 is being driven.

The driving member 116 of clutch 50 is driven by means of an endless chain 124 which is driven by a sprocket on the shaft 126 on which the slip clutch 68 is mounted. A further sprocket driving a second endless chain 128 is mounted on shaft 126 and this endless chain 128 drives the driving member 130 of clutch 66. The third latch member 64, for operating clutch 66, is mounted at the side of the supporting platform 12 and upon movement of the latch member 64 a lever arm 132 secured to the latch member moves a stop 134 out of a position in which it supports a spring-loaded operating arm 136 of clutch 66. Movement of arm 136 moves the driven member 138 of clutch 66 into driving engagement with the driving member. A stop mechanism 140 is provided for preventing reverse rotation of the shaft 142 on which clutch 66 is mounted. Upon operation of clutch 66 drive is transmitted via shaft 142 to the two endless chains 20 and 22 which carry pusher rod 30. In order to deactuate the clutch after the pusher rod 30 has moved so as to discharge the eight bales discharged onto the bale collector the pusher rod 30 is adapted to engage a clutch de-actuating lever 144 mounted on the bale collector. Upon movement of lever 114 a spring-loaded member 146 is moved against the action of the spring so as to return member 134 to the position in which it supports arm 136 to dis-engage clutch 66.

As previously mentioned the means whereby the bale collector is coupled to the baler in use is such that the bales are discharged from the baler substantially centrally of the platform 12 through the guide element 42 for movement along a path extending in the direction of movement of the bale collector and spaced from the sides thereof. The first pusher rod 28 is normally disposed to one side of this path so that when the transfer control means consisting of first and second latch members 32 and 48 is operated as a result of the discharge of a first pair of bales onto the platform, the rod 28 is moved transversely of the path from one side thereof to the other to move the pair of bales to the other side of the platform. When the second pair of bales are on the platform and latch members 32 and 48 have again been operated, the rod 28 is moved from said other side to said one side of the path thereby moving said second pair of bales to said one side of the platform. The third pair of bales is similarly moved to the other side of the platform and the fourth pair of bales moved to said one side of the platform thereby causing operation of the control means for the discharge means, said discharge control means being constituted by the third latch member 64. In this way the greatest number of bales which is moved by the rod 28 is four. It is not, therefore, necessary for the means driving the rod 28 to be of such rigid construction as would be necessary if, for example, all eight bales were moved at any one time by the rod 28.

What we then claim is:

1. A bale collector having means for connection to a baler and including:
   (a) a platform for receiving and supporting bales discharged from the baler,
   (b) transfer means for disposing bales discharged onto the platform in a predetermined array,
   (c) control means for said transfer means, said control means being responsive to the discharge of a first predetermined number of bales onto the platform,
   (d) discharge means for discharging bales from the platform in said predetermined array,
   (e) control means for said discharge means said control means being responsive to formation of said predetermined array,
   (f) guide means at the front of the platform for registering with the discharge means of the baler to guide the bales for movement along a predetermined path extending in the direction of movement of the bale collector and spaced from the sides of the platform,
   (g) said transfer means comprising a pusher element extending parallel to and normally spaced from said path and on one side thereof and means for moving the pusher element upon a first operation of said transfer control means transversely of said path from one side to the other side thereof to displace bales on said path to said other side of the path and for moving the pusher element upon a succeeding operation of said transfer control means from said other side to said one side of said path to move the next succeeding bales on said path to said one side of the path;

(h) said bale collector having the improvement in that; the discharge means includes a second pusher element extending transversely to the direction of movement of the bale collector, (i) said second pusher element being mounted on a pair of endless chains which are driven to effect a cycle of movements of said second pusher element over and beneath said platform, (j) said discharge control means including means for transmitting drive to said chains and, (k) means being provided beneath said platform whereby said drive is interrupted upon completion of a cycle of movements of said second pusher element.

2. A bale collector having means for connection to a baler and including:

(a) a platform for receiving and supporting bales discharged from the baler, (b) transfer means for disposing bales discharged onto the platform in a predetermined array, (c) control means for said transfer means, said control means being responsive to the discharge of a first predetermined number of bales onto the platform, (d) discharge means for discharging the bales from the platform in said predetermined array, (e) control means for said discharge means, said control means being responsive to formation of said predetermined array, (f) guide means at the front of the platform for registering with the discharge means of the baler to guide the bales for movement along a predetermined path extending in the direction of movement of the bale collector and spaced from the sides of the platform, (g) said transfer means comprising a pusher element extending parallel to and normally spaced from said path and on one side thereof and means for moving the pusher element upon a first operation of said transfer control means transversely of said path from one side to the other side thereof to displace bales on said path to said other side of the path and for moving the pusher element upon a succeeding operation of said transfer control means from said other side to said one side of said path to move the next succeeding bales on said path to said one side of the path, said bale collector having the improvement in that:

(h) the pusher element of said transfer means is a rod connected to a collar mounted on a guide shaft, (i) said collar being connected by a linkage to a gear, which gear is caused to move through half a revolution upon actuation of said transfer control means.

3. A bale collector having means for connection to a baler and including:

(a) a platform for receiving and supporting bales discharged from the baler, (b) transfer means for disposing bales discharged onto the platform in a predetermined array, (c) control means for said transfer means, said control means being responsive to the discharge of a pair of bales onto the platform, (d) discharge means for discharging bales from the platform in said predetermined array, (e) control means for said discharge means said control means being responsive to formation of said predetermined array, (f) guide means at the front of the platform for registering with the discharge means of the baler to guide the bales for movement along a predetermined path extending in the direction of movement of the bale collector and spaced from the sides of the platform, (g) said transfer means comprising a pusher element extending parallel to and normally spaced from said path and on one side thereof and means for moving the pusher element upon a first operation of said transfer control means transversely of said path from one side to the other side thereof to displace bales on said path to said other side of the path and for moving the pusher element upon a succeeding operation of said transfer control means from said other side to said one side of said path to move the next succeeding bales on said path to said one side of the path, said bale collector having the improvement in that:

(h) the transfer control means comprises a first latch member arranged to be operated, by the first of a pair of bales upon the discharge of the second of said pair of bales onto the platform and, (i) a second latch member arranged to be operated by said second bale upon said second bale being disengaged from said guide means and being supported in a horizontal condition on said platform.

4. A bale collector according to claim 3 in which the drive to the transfer means pusher element includes a clutch, and said first and second latch members are connected by a Bowden mechanism to an operating mechanism for said clutch.

References Cited

UNITED STATES PATENTS

| | | | |
|---|---|---|---|
| 2,767,866 | 10/1956 | Heinje | 214—42 |
| 3,010,593 | 11/1961 | Adams et al. | 214—520 |
| 3,139,196 | 6/1964 | Legocki | 214—6 |
| 3,163,302 | 12/1964 | Pridgeon | 214—6 |
| 3,308,971 | 3/1967 | Sinden et al | 214—6 |

GERALD M. FORLENZA, *Primary Examiner.*

ALBERT J. MAKAY, *Assistant Examiner.*